United States Patent
Lidström et al.

(10) Patent No.: US 10,163,114 B2
(45) Date of Patent: Dec. 25, 2018

(54) METHOD AND APPARATUS FOR PROVIDING DIFFERENTIATED SERVICE LEVELS IN A COMMUNICATION NETWORK

(75) Inventors: Mattias Lidström, Stockholm (SE); Mona Matti, Nacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1566 days.

(21) Appl. No.: 12/809,097

(22) PCT Filed: Dec. 21, 2007

(86) PCT No.: PCT/SE2007/001147
§ 371 (c)(1),
(2), (4) Date: Jul. 2, 2010

(87) PCT Pub. No.: WO2009/082278
PCT Pub. Date: Jul. 2, 2009

(65) Prior Publication Data
US 2011/0125509 A1    May 26, 2011

(51) Int. Cl.
*G06Q 30/02* (2012.01)
*G06Q 10/06* (2012.01)
*H04L 12/24* (2006.01)

(52) U.S. Cl.
CPC ......... *G06Q 30/02* (2013.01); *G06Q 10/0631* (2013.01); *H04L 41/5003* (2013.01); *H04L 41/5009* (2013.01); *H04L 41/5067* (2013.01)

(58) Field of Classification Search
CPC ............. H04L 41/5003; H04L 41/5009; H04L 41/5067; G06Q 30/02; G06Q 10/0631
USPC .......... 705/1.1, 7.12; 370/229–235, 250–253
See application file for complete search history.

(56) References Cited

U.S. PATENT DOCUMENTS

| | | | |
|---|---|---|---|
| 2004/0085909 A1* | 5/2004 | Soliman | 370/252 |
| 2006/0009193 A1 | 1/2006 | Bazzica | |
| 2006/0140381 A1 | 6/2006 | Croak et al. | |
| 2007/0133428 A1* | 6/2007 | Taylor et al. | 370/252 |
| 2007/0195788 A1* | 8/2007 | Vasamsetti et al. | 370/395.21 |
| 2009/0070454 A1* | 3/2009 | McKinnon et al. | 709/224 |

FOREIGN PATENT DOCUMENTS

| | | |
|---|---|---|
| EP | 1667417 A1 | 6/2006 |
| GB | 2367445 A | 4/2002 |
| GB | 2408816 A | 6/2005 |

OTHER PUBLICATIONS

Karten, Naomi, "An SLA Template and How to Use It," www.nkarten.com (Year: 2004).*

* cited by examiner

*Primary Examiner* — Carrie S Gilkey
(74) *Attorney, Agent, or Firm* — Coats & Bennett, PLLC

(57) ABSTRACT

A method and apparatus for automatically adapting a service level for a service consumed by a terminal user in a communication network, using a service level control system (308,312,400). A service usage analyzer (308,402) collects information on service usage of the user, and estimates the user with respect to his/her service usage based on features of a usage pattern extracted from the collected service usage information. A subscription policy manager (312,412) then adapts the service level for service usage based on the user estimation, by adjusting or introducing a corresponding rule or policy in the user's subscription profile (304). The user will then consume the service with the new adapted service level.

20 Claims, 2 Drawing Sheets

METHOD AND APPARATUS FOR PROVIDING DIFFERENTIATED SERVICE LEVELS IN A COMMUNICATION NETWORK

TECHNICAL FIELD

The present invention relates generally to a method and apparatus for providing differentiated and flexible levels of service quality to terminal users in a communication network.

BACKGROUND

A multitude of different, multimedia services have been developed using packet-switched communication over IP (Internet Protocol). Multimedia services typically involve the transmission of media in different formats and combinations over IP networks. A network architecture called IMS (IP Multimedia Subsystem) has been developed by the $3^{rd}$ Generation Partnership Project (3GPP) as a platform for handling and controlling multimedia services and sessions, commonly referred to as the IMS network. Terminal users connected to various access networks, including fixed and mobile networks, can thus be served by the IMS network to invoke and consume multimedia services. The services that can be implemented by using IMS may involve file transfers, media downloads, and conversational sessions such as MMTel (Multimedia Telephony) and PoC (Push-to-talk over Cellular). However, the present invention is not limited to services enabled by IMS.

Operators of access networks typically monitor the performance of their networks with respect to various characteristics and aspects, in order to find any performance-related shortcomings and to configure different elements and parameters in the network impacting the network performance. Network performance is monitored also to ensure that various obligations towards subscribers and content providers are met, such as service level agreements and that expected levels of QoS (Quality of Service) are fulfilled. Various sensors and counters can be installed in different network nodes in order to collect measurements of predefine performance-related parameters during operation of the network. In this context, a performance-related parameter is often referred to as "KPI" (Key Performance Indicator) being an indication of the service quality basically as perceived by the service user. Data throughput and latency are typical examples of such performance-related parameters or KPIs.

A policy control node is typically used by the access network, responsible for authorisation and admission of communication sessions for terminals in the network, based on various predefined policies and rules. According to 3GPP, the policy control node operates according to a function called PCRF (Policy and Charging Rule Function), sometimes alternatively referred to as PDF (Policy Decision Function).

Predefined session admission rules thus specify when to allow sessions for specific users and/or services. Such rules and other parameters can be combined into policies valid for specific users or services, or both, to form subscription profiles. These subscription profiles are stored in a database called SPR (Subscription Profile Repository) residing in the policy control node or PCRF. When a session request for a certain service is received from a terminal user, a policy relevant to that user and service is thus applied for allowing or rejecting the session request, and also for setting appropriate communication parameters and reserving network resources.

Many services in communication networks require a certain QoS (Quality of Service) in order to provide an adequate and expected result to users consuming the services. Per UMTS (Universal Mobile Telecommunications System) networks, different traffic classes have been defined to cater for various quality requirements, e.g. regarding hit rates and delays, when reserving network, resources for a requested service. These traffic classes include "conversational", "streaming", "interactive" and "background", being applied to services basically sensitive to transfer delays in different ways. For example, services of the conversational class tolerate only small delays, also referred to as "real-time", whereas the background class is applied to the least delay-sensitive services, also referred to as "best effort".

Another aspect that typically dictates the QoS requirements for a session is the subscription type. Thus, subscribers may be offered specific subscription types with different levels of service quality. For example, using current terminology, a "Platinum" subscription may be defined with a relatively high service level, whereas "Gold", "Silver" and "Bronze" subscriptions may provide successively lower service levels. Moreover, specific services may also be offered with different service levels, e.g. at different prices and/or depending on the time of day, week or season.

In this description, the term "service level" is used to generally represent the level of service quality in any respect as perceived by a user when consuming a service, sometimes also referred to as "QoE" (Quality of Experience). An alternative term for service level could be "quality level" in this description. Factors that could impact the service level in the context of this description may include, without limitation: service availability, media quality, session set-up latency, media latency, data throughput, bandwidth, error rate, service reliability, and so forth. Effectively, the appropriate service level is implemented for a session when roles in the user's subscription profile are enforced in the network.

FIG. 1 illustrates how a media session is established for a user of a mobile terminal A, according to the prior art. Terminal A is connected to a mobile access network in which a network gateway GGSN (Gateway GPRS Support Node) 100 is generally responsible for reserving media transport resources in the access network for media sessions.

Briefly described, terminal A requests a service involving media communication with an opposite party B, in a first step 1:1, from an application in an IMS network, here represented by an IMS core 102. In a next step 1:2, authorisation of the requested service is generally made by a policy control node 104 associated with the mobile network. Further, the subscription profile of the user is fetched from an SPR 106, as shown by a step 1:3. Rules in the subscription profile dictating the service level, are also enforced in GGSN 100, in a further step 1:4, to reserve network resources and set communication parameters for the forthcoming media session. The media session with party B can now be conducted as shown by a step 1:5. When the session is completed, a charging data record "CDR" is finally sent in a step 1:6 from GGSN 100 to a charging system 108 responsible for billing the user in due course.

The service quality provided to a user may thus be highly dependent on terms in the user's subscription, i.e. the parameters and QoS attributes being defined as rules in the subscription profile. In particular, the QoS attributes effectively impact the resulting KPIs if measured during service usage. For example, a bronze user consuming a streaming service could be allowed a streaming session with a maximum throughput of 64 kbps (kilobits per second), while a platinum user may be guaranteed a minimum throughput of 128 kbps for the same streaming session.

When requesting a specific service involving media communication, a user is first provisioned by the policy control node based on the user's subscription profile, as described above, before a media session can be established accordingly. The various terms for service usage on a session basis are thus dictated by the rules in the user's subscription profile determining the due service level. These rules may also be evaluated with respect to a detected "context" of the user including the present environment or situation such that different rules are valid in different circumstances. Mechanisms are available for detecting the current context of the user in terms of various context parameters and aspects, which are not necessary to describe further to understand the following description.

Thus, services can be provided to different users with differentiated service levels, e.g. for platinum, gold, silver and bronze users, by setting parameters and QoS attributes, i.e. rules, in their subscription profiles. The terms defined in the subscription profile are thus more or less static, basically as agreed by the operator and the user, and any service level differentiation is determined by the agreed subscription profiles.

However, a more flexible differentiation of service levels would be desirable since users having basically the same subscription, at least with respect to one or more particular services, may behave somewhat differently in terms of service usage and their payment of bills. In the solutions available today, all users having established the same subscription terms or rules for consuming a particular service, will automatically obtain the same service level. It is thus a problem that it is not easy to provide different service levels for users having the same subscription terms, e.g. to encourage or promote certain users.

It may be desirable for network operators and service providers to give better terms for users deemed more "important" than others, for various reasons, or to stimulate the usage of specific services, and so forth. For example, two users A and B have the same subscription terms X of a service Y, providing for a certain service level. User A consumes the service Y much more frequently than user B does, without interrupting the service and without complaining to the operator, also paying the bills in due time. On the other hand, user B consumes the service Y only very occasionally and is not inclined to use other services being offered to him/her, and so forth.

In the situation above, users A and B receives the same service level when consuming service Y, as dictated by subscription terms X. However, from the perspective of the network operator or service provider, user A is deemed more "valuable" than user B and has a greater potential for increasing the usage of services offered. According to the solutions available today, the only way to generally stimulate increased service usage is to offer new subscription terms to selected users, which requires manual efforts to identify those users and negotiate with them.

SUMMARY

It is an object of the present invention to address the problems outlined above. Further, it is an object to provide a solution for applying differentiated service levels in a communication network for terminal users in the network.

These objects and others may be obtained by providing a method and apparatus according to the independent claims attached below.

According to one aspect, a method is provided for adapting a service level for a service consumed by a terminal user in a communication network. Information on service usage by the user is collected in a service level control system, and features of a usage pattern of the user are extracted from the collected service usage information. The user is then estimated with respect to his/her service usage based on the extracted usage pattern features, by applying a machine learning algorithm on data of the extracted usage pattern features. The service level is finally adapted based on the result from the user estimation, wherein the service, is consumed by the user with the adapted service level.

According to another aspect, a service level control system is provided for adapting a service level for a service consumed by a terminal user in B communication network. The system comprises a service usage analyser configured to collect information on service usage of the user, and estimate the user with respect to his/her service usage based on features of a usage pattern extracted from the collected service usage information. The system further comprises a subscription policy manager configured to adapt the service level for service usage, based on the user estimation such that the service is consumed with the new adapted service level.

Different embodiments are possible in the method, and system above. For example, the service usage analyser may comprise a data storage configured to collect the service usage information as raw data, a feature extractor configured to extract the usage pattern features from the raw data based on a predefined strategy, and a user estimator configured to estimate the user with respect to his/her service usage, based on the extracted usage pattern features and to provide the resulting user estimation to the subscription policy manager.

Information on service usage may be obtained from a node that logs sessions executed in the network, e.g. by means of charging data records generated by a gateway node in the network.

The usage pattern features may be extracted by applying the machine learning algorithm and an associated predefined strategy that dictates which features of service usage are relevant and to be considered.

The user may be estimated by classifying the user according to one or more predefined service usage conditions. A predefined service usage condition may be that a certain predetermined threshold level is exceeded with respect to service usage. The threshold may relate the number of times the service has been consumed, the amount of communicated data, the connection duration, or the number of times other services have been invoked by the user. A plurality of different threshold levels of one or more service usage conditions may have been predefined to classify users by an estimation score.

The machine learning algorithm may be selected from a set of predefined machine learning algorithms, e.g. depending on the service type, characteristics of the collected usage information, or what aspect of the service usage is deemed to be valid for the service level.

The service level may be adapted in the network for the user by adjusting or introducing a corresponding rule or policy in the user's subscription profile, which is enforced in the network by a policy control node whenever the user invokes the service. The rule or policy may be pushed to the policy control node which will then update the subscription profile in a subscriber profile repository SPR.

The service level may be adapted for a plurality of services consumed by a terminal user in the network. The usage pattern features of the user can be extracted at regular intervals or in response to an operator input command.

Further possible features and benefits of the present invention will be explained in the detailed description below.

BRIEF DESCRIPTION OF THE DRAWINGS

The invention will now be explained in more detail by means of exemplary embodiments and with reference to the accompanying drawings, in which.

DETAILED DESCRIPTION

Briefly described, the present invention can be used for dynamically providing a service level for a terminal user in a communication network, depending on a detected precedent service usage of that user. A pattern of service usage can be extracted from information on earlier service usage and possibly also from other behaviour of the user. The level, of quality for services consumed by the user, i.e. the service level, can then be adapted according to an estimation of the user made with respect to parameters in the usage pattern deemed relevant for service usage. The service level is controlled by rules defined in the subscription profile of the user, which thus can be changed at least temporarily.

In this way, the service level for a specific service can be increased for the user, at least temporarily, if deemed to have relatively high potential for consuming the service to a greater extent when stimulated by the increased service level. By increasing the service level, the user will most likely be more satisfied and loyal by not switching to another operator subscription.

Figure 2:
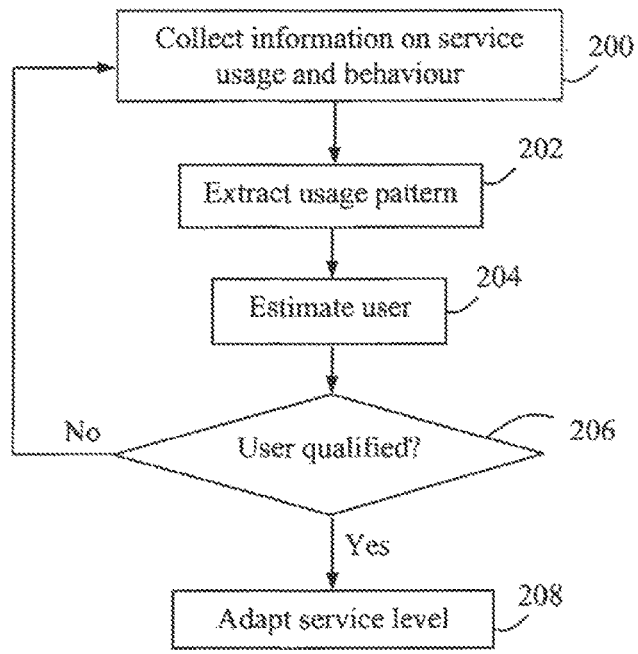
FIG. 2 is a flow chart illustrating a procedure for adapting the service level for a terminal user, in accordance with one embodiment.

FIG. 2 is a flow chart illustrating an exemplary procedure, basically executed automatically in a service level control system, for adapting the service level for a terminal user in a communication network, using the present solution. It is assumed that the user, being a "subscriber" in the network, is of course currently entitled to a certain service level according to his/her subscription profile when consuming a service in the network. Although described here for a single user, the procedure can of course be executed for any number of terminal users at the same time.

Figure 1:
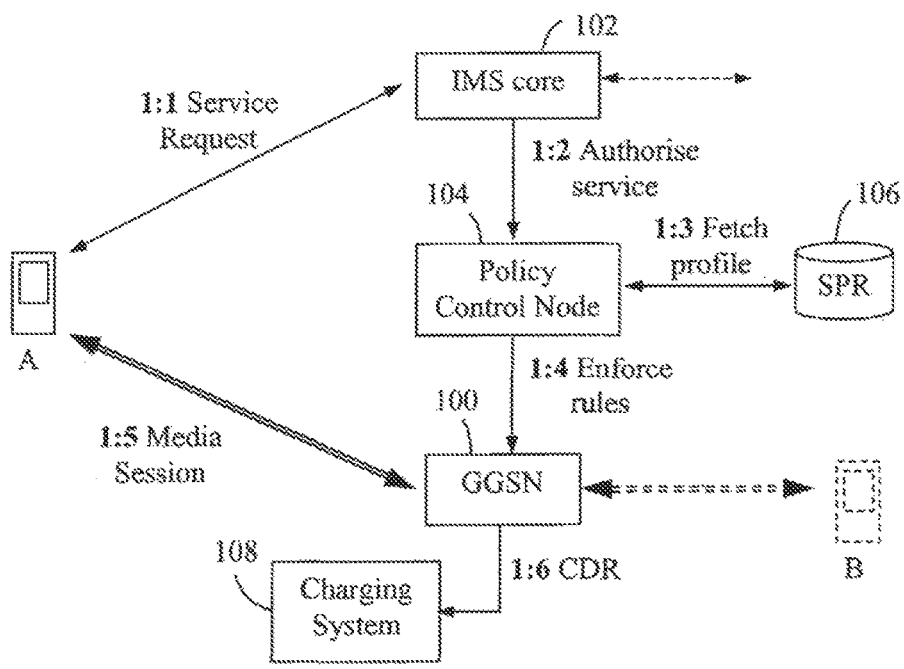
FIG. 1 is a schematic view where a communication terminal A executes a session with another party B, according to the prior art.

In a first step 200, information on service usage and behaviour of the terminal user is collected in a data storage or the like in the service level control system. The service usage can be obtained from charging data records CDRs that are typically generated in the network according to regular procedures, or from any node that generally logs sessions executed in the network. For example, the GGSN in a mobile network is obliged to log each session and send a CDR to a charging system after completion of a session, as described for FIG. 1 above. Further behaviour information on the user may be obtained from various behaviour monitoring functions, if implemented, which will be described in more detail below. This step will preferably be performed over an extended period of time to accumulate a history of service usage for the user, e.g. revealing statistics, trends, etc.

In a next step 202, a usage pattern is generally extracted automatically from the collected information on the service usage and behaviour of the user, by means of a suitable analysis mechanism. For example, a predefined strategy may be applied that dictates which usage features are relevant and to be considered, possibly limited to a specific service or group of services. The strategy may be selected depending on the identity of the user, the service type, characteristics of the collected usage data, and/or what aspect of the service usage is deemed to be valid for the service level, and so forth. Further, a predefined machine learning algorithm associated with the strategy may also be applied to extract the usage pattern.

A suitable mathematical transformation can also be applied for processing the collected usage data, in order to extract specific features, conclusions or knowledge of the usage pattern according to the applied strategy, e.g. in the form of statistic compilations and facts. Extracting the usage pattern and processing the usage data can be accomplished by any suitable technique which is however outside the scope of the present invention.

Then, the user is automatically estimated (or evaluated) with respect to his/her service usage in a step 204, based on the extracted features of the usage pattern, by applying the machine learning algorithm on the usage pattern data.

Estimating the user may include classifying the user according to predefined criteria, using the machine learning algorithm. Furthermore, the strategy and associated machine learning algorithm may be selected from a set of predefined strategies/algorithms.

For example, the user may be classified as a "level X customer" if a predefined service usage condition or criteria is fulfilled, X representing a certain level of estimation. The predefined service usage condition may be that a certain predetermined threshold is exceeded with respect to service usage, e.g., the number of times a specific service has been consumed, or the amount of communicated data, or the connection duration, or the number of times other services have been invoked by the user, or a combination of any number of such thresholds, etc.

The user classification may also be based on further behavioural conditions, e.g. chat the user always pays his/her bills in due tint, or what type of content the user consumes. Plural service usage conditions and behavioural conditions may also be combined in any manner for determining the classification, and the present invention is not limited in this respect.

Furthermore, a plurality of different threshold levels of one or more service usage conditions may have been predefined to classify users by an estimation score on a scale, e.g. a first threshold value for level 1 customers, a second threshold value for level 2 customers, a third threshold value for level 3 customers, and so forth. In this way, the user can be ranked in different levels according to the estimation and resulting estimation score.

It is then checked in a further step 206 whether the user is qualified to obtain a specific service level other than the one currently valid, based on the estimation made in step 204. For example, level 1 customers may be qualified to obtain a relatively modest service level, whereas level 2 and level 3 customers will obtain successively higher service levels.

Thus, if the user is qualified for a specific service level other than his/her current one, the service level is adapted accordingly in a step 208, by adjusting or introducing a corresponding rule or policy in the subscription profile that will impact the resulting service quality. This rule or policy will then be enforced in the communication network whenever the user invokes the service such that the service will be consumed with the new adapted service level. On the other hand, if is determined in step 206 that the user is not qualified for any new service level, the process may return to step 200 for continuing the collection of service usage information, and so forth.

By this solution, users deemed valuable and having high potential for increased service usage can easily and automatically be identified from their precedent service usage and possibly other related behaviour. These users can further be stimulated by increasing their service level when consuming services in the network, or at least some specific service(s), in the manner described above. It should be noted that, even though the exemplary embodiments in this description generally relates to a single service, the service level may be adapted in this way for a plurality of services consumed by a terminal user in the network.

The users being estimated with relatively high qualifications with respect to service usage can be referred to as "Most Valuable Customers" MVCs, and be rewarded with a better service quality for being MVCs. Moreover, if it is generally known to users that frequent usage of a service could result in a higher service level, the overall service usage will most likely increase consequently. Hence, the described procedure can result in better revenue for operators, as well as higher customer satisfaction and loyalty.

Figure 3:
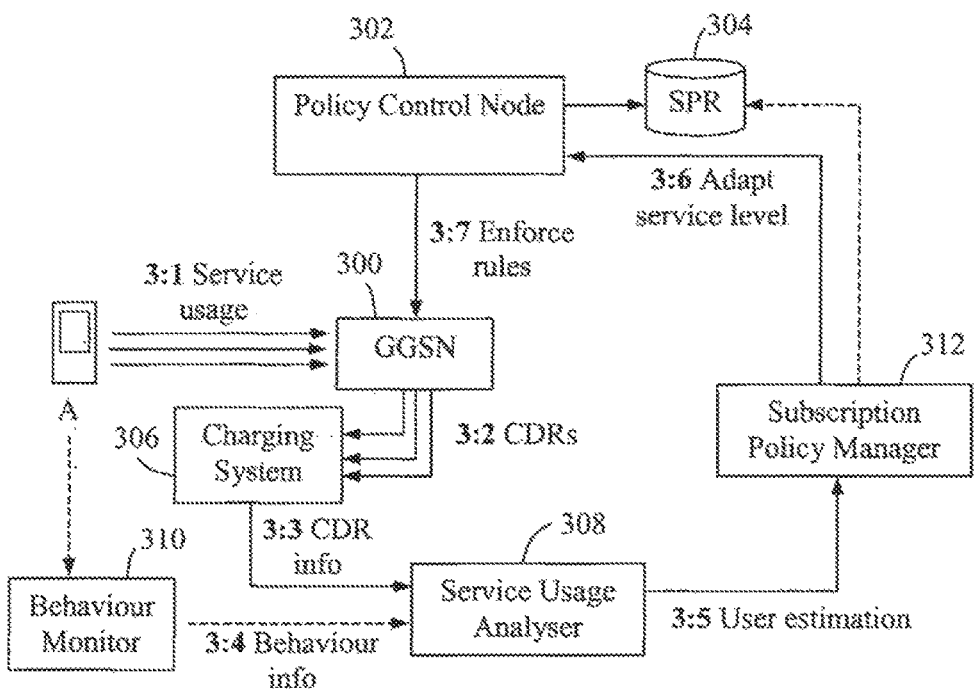
FIG. 3 is a schematic view illustrating a network structure where the service level can be adapted for the user of a terminal A, in accordance with another embodiment.

FIG. 3 is a block diagram illustrating a network arrangement for adapting the service level based on service usage, according to one possible implementation of the procedure in FIG. 2. As similar to FIG. 1, a user executes media sessions by means of a terminal A, generally shown in a step 3:1, over a GGSN 300 with a service level determined by rules enforced by a policy control node 302 according to the user's subscription profile stored in an SPR 304. Again, a 3GPP network is used here as an example, although the present invention is not limited thereto. Another step 3:2 illustrates that GGSN 300 sends a CDR to a charging system 306 whenever terminal A is involved in a session, the CDR effectively containing service usage information.

The network arrangement in FIG. 3 further comprises a "service usage analyser" 308 in which the CDR information is collected from the charging system 306 in a step 3:3, or alternatively directly from GGSN 300. Further behaviour information relevant for determining the service level, may be collected in service usage analyser 308 from a behaviour monitor 310 or other information sources, as shown in an optional further step 3:4. For example, behaviour monitor 310 may provide information on the user's paying habits, or the source and nature of downloaded content, etc.

Any number of such additional behaviour monitors or other information sources within or outside the network may provide relevant information on the user detected in any suitable manner, for example, active probes may be used in the network which are capable of analysing the headers of communicated packets, sometimes referred to as "packet sniffing" or "deep packet inspection". In this way, it can be detected which web sites and servers the user visits, or what type of content the user downloads. These probes are sometimes used for generating various records or log files, such as EDR (Event Detail Record). Further information on the user may also be collected, such as his/her bill paying habits and demographic data.

The service usage analyser 308 then extracts a usage pattern, including various service usage related features, from the collected CDR information and any otherwise obtained user information. A predetermined strategy and associated machine learning algorithm may then be applied to obtain specifically interesting or relevant aspects on the usage pattern. The service usage analyser 308 also performs estimation of the user based on the extracted usage pattern features, using the machine learning algorithm.

A further step 3:5 illustrates that the service usage analyser 208 provides the estimation made of the user to a "subscription policy manager" 312, e.g. according to a classification scheme as described above. The estimation can be presented as an estimation score or the like with respect to certain parameters deemed relevant to the service usage, e.g. in accordance with the strategy and machine learning algorithm used for extracting the usage pattern features, basically as described above for step 204 in FIG. 2. The estimation score may be determined from an evaluation scheme where different parameters or aspects or service usage may give specific estimation scores, which may be differently weighted, together providing a total score as an estimation of the user, e.g. levels 1, 2 and 3 customers, which will be described in more detail below.

The subscription policy manager 312 then determines which service level the user is qualified for, e.g. based on his/her total score according to the estimation above. A new service level different from the one currently valid for the user, may then be determined. A corresponding predefined policy with rules dictating the service level may then also be applied for the user, at least temporarily.

Such service level policies and rules may also define the service levels in terms of communication parameters or price rates, etc. For example, a certain policy may dictate that a user with a total score of, say, between "30" and "50" according to some predefined scale, is entitled to "service level 3" that provides a bit rate of 64 kbps for a streaming service, during a week. The policy may further dictate that the same user will be entitled to service level 3 for another week if he/she stays within the above estimation score interval during the first week.

The subscription policy manager 312 then orders the policy control node 302 to apply the new service level for services consumed by the user, at least temporarily, in a step 3:6. In this step, manager 312 may push a corresponding rule or policy dictating the new service level to node 302 as shown by a full arrow, which then updates the SPR 204, or directly to the SPR 204 as shown by a dashed arrow. Whenever a session is established for the user, policy control node 302 will retrieve the new rule or policy from SPR 204 and enforce the rule or policy in the network. Depending on the implementation, it may be sufficient to push the new service level to policy control node 302 which then could be capable of applying a corresponding policy/rule and update the subscription profile in SPR 204 accordingly.

Although shown in the figure as separate nodes, the above-described subscription service usage analyser 208 and policy manager 312 may be implemented in a common node. In either case, they basically provide a "service level control system" which term will be used hereafter to generally represent the apparatus needed to put the described embodiments and functions into practice.

Figure 4:
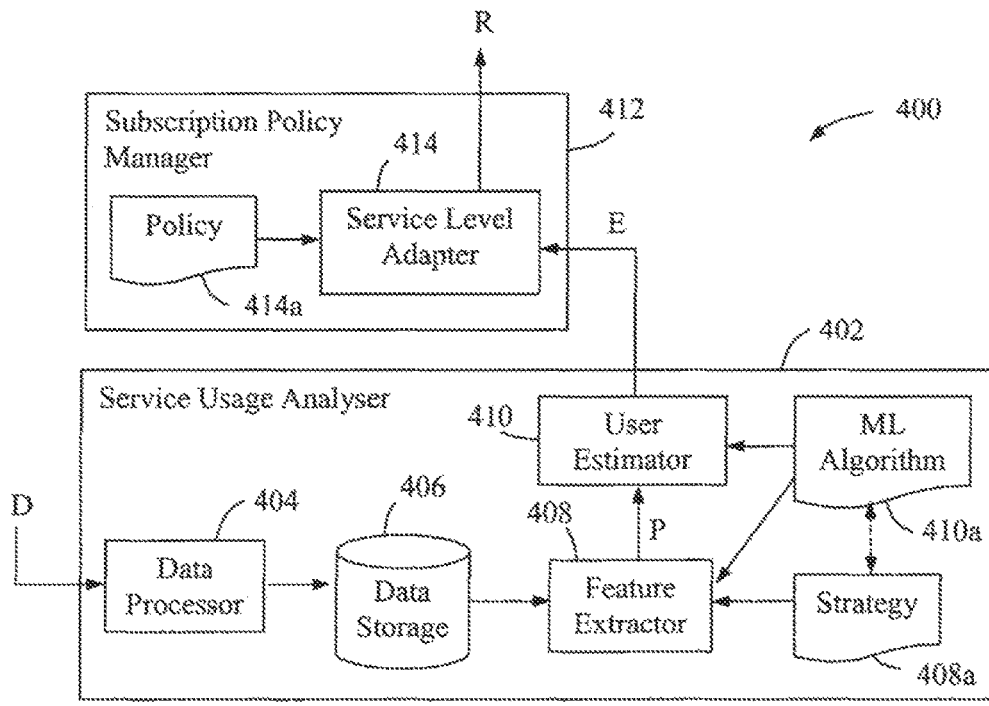
FIG. 4 is a block diagram illustrating a service level control system, in accordance with yet another embodiment.

FIG. 4 illustrates a non-limiting example of how such a service level control system 400 can be configured in more detail, basically comprising a service usage analyser 402 and a subscription policy manager 412. It should be noted that this figure merely illustrates the various functional units in a logical sense, while the skilled person is free to implement these functions in practice using any suitable software and hardware means and structures. Thus, the present invention is generally not limited to the shown structure of the system 400.

The service usage analyser 402 is configured to receive service usage data D from various information sources, e.g. the charging system 206, GGSN 200 and behaviour monitor 210 described for FIG. 3. A data processor 404 may be used to pre-process the incoming service usage data D, which may include different filtering, compilation and/or calculation operations, in order to obtain data suitable for further treatment as follows.

A data storage 406 is configured to collect processed service usage data D as "raw data" in this context, basically according to step 200 in FIG. 2. The collecting of raw data in storage 406 may be a more or less continuous ongoing process as the user consumes services in the network, such that a history of service usage is obtained.

A feature extractor 408 is configured to extract a pattern P of service usage and behaviour from the raw data of a specific user in data storage 406, e.g. using a suitable mathematical transformation to create statistics, which is done automatically either at regular intervals or in response to an operator input command or other suitable triggering means.

As described for step 202 above, feature extractor 408 may apply a predefined strategy 408a that dictates which aspects of the usage are relevant, e.g. for a specific service or group of services, thereby acting basically as a feature filter. The process in feature extractor 408 will then be basically controlled depending on the strategy 408a. A machine learning algorithm 410a associated with the strategy 408a can also be applied by feature extractor 408 to obtain the pattern P.

A user estimator 410 is configured to automatically estimate the user with respect to his/her service usage, based on the extracted features of the usage pattern, e.g. by applying the machine learning algorithm 410a also on the usage pattern data P from feature extractor 408. Thus, a set of strategies and associated predefined machine learning algorithms may have been predefined in the service usage analyser 402 to be applied for different users, e.g. based on the identity of the user, the type of service(s) consumed, the characteristics of collected raw data, etc. Estimating the user may include classifying the user as an estimation score on a seals with different levels 1, 2, 3 etc, as described above.

The user estimator 410 is further configured to convey the resulting user estimation E to the subscription policy manager 412. A service level adapter 414 in manager 412 is configured to determine what service level the user is qualified to obtain, based on the estimation E from user estimator 410. For example, level 1, 2 and 3 customers may be qualified to obtain successively higher service levels, in the manner described above.

When service level adapter 414 has established a service level for the user, a corresponding policy 414a may be applied and one or more resulting rules R are presented (or pushed) to a policy control node which then updates its associated SPR (not shown here) accordingly. Here, the one or more rules R generally represent any policy and/or rule(s) that will be enforced in the network to provide the adapted service level for the user whenever consuming the service.

As mentioned for FIG. 3, the service usage analyser 402 and subscription policy manager 412 can be implemented in any suitable manner, e.g. either as separate nodes or as a common node, or even as functional units in the policy control node. However, the present invention is not limited to any particular implementation in this regard.

Various available machine learning algorithms and paradigms may be useful for estimating the user according to the above, including clustering methods (such as "Soft Clustering with Probabilistic Latent Semantic Analysis" (PLSA) and "Soft Clustering with Gaussian Mixture Models" (GMMs)), novelty detection (such as "One-Class Support Vector Machines" and "Density Modelling techniques"). Social Networks (SN) (such as "kernel methods applied over graph"), and supervised classification (such as "Neural network Multilayer Perceptrons" (MLPs), "Radial Basis Function Networks" (RBFNs), Decision trees, "Support Vector Machine" (SVM)).

The machine learning process can be applied on data originating from different sources throughout the network, and specific triggers may be used to find interesting aspects of the users' behaviour of service usage that could influence their subscription profiles in the manner described above. These behaviour triggers can thus be set for services in order to detect the service usage behaviour and subsequent trends and changes in service usage.

Examples of Behaviour Triggers:
  Increased usage of services,
  Sew services are investigated and used,
  A new service is used that attracts interest from many users,
  Usage of old service decreases or increases,
  Online service usage decreases or increases,
  Periodic usage of online services, and
  User updates or changes his/her terminal.

Any of these triggers and others can be used to create a predefined strategy, applied by the feature extractor on the collected raw data, that dictates which aspects of the usage are relevant for the following user estimation. The user can then be estimated by evaluating certain predefined usage parameters or conditions, which can be assigned different weight factors W depending on their relevance, when calculating the total estimation score for the user. Below, some examples of such predefined usage parameters A-E are given:

Predefined Usage Parameters:
A) frequent usage of service X, W=20,
B) Usage of service X and further new services, W=20,
C) User belongs to a large net community using the same services, W=10,
D) Usage of service X has decreased lately, W=−5,
E) Periodic usage of service X, W=10, These usage parameters or conditions may be evaluated for two users U1 and U2 having the same subscription Y of service X, and their total estimation score can be determined according to the following scheme:

| | A (W = 20) | B (W = 20) | C (W = 10) | D (W = −5) | E (W = 10) | Total score |
|---|---|---|---|---|---|---|
| User U1: | 20 | 20 | 10 | — | — | 50 |
| User U2: | — | — | 10 | −5 | 10 | 15 |

With reference to the example of FIG. 4, the user estimator 410 may be capable of determining the total estimation score in the above manner, which is then conveyed to the service level adapter 414 in subscription policy manager 422 as the user estimation E. Service level adapter 414 then determines the corresponding service level the user is qualified for, based on the total estimation score. A predefined policy with rules dictating that service level, is then applied by pushing the rules R and/or policy to a policy control node or SPR.

The estimation score can be used to rank the users according to a scale with different levels 1, 2, 3 . . . , and different actions may be taken to change the service level for users with different scores. For example, the scale may define that users with & total estimation score above 30 are qualified for service level 3, users with a total estimation score between 20 and 30 are qualified for service level 2, and users with a total estimation score below 20 are qualified for service level 1. The actions for users qualified for different service levels may be as follows:

Service level 3—"Provide higher bitrate for service X during next week", "If user maintain the same rank during next week, provide another week with higher bitrate for service X", and "If user maintain the same rank for another week, offer upgraded subscription of service X with discount".

Service level 2—"Provide higher availability for service X during one week".

Service level 1—"Provide best effort availability for service X during one week".

Further actions may be taken by the network operator depending on the resulting estimation score for users, in order to stimulate the users to find and consume more services. For example, if a specific user remains in a certain score interval (e.g. 15-20) for a preset time period, information on the service and a recommendation to use the service more frequently may be sent to the user. The skilled person will readily understand that the possibilities to take different actions depending on the estimation results are unlimited, although being outside the scope of the present invention.

The above-described procedure of adapting the service level for users depending on their usage behaviour, may continue automatically requiring a minimum of manual actions from the network operator and without disturbing the network operation and services whatsoever. While some initial efforts are required to configure the service level control system (e.g. service usage analyser 402 and subscription policy manager 412 in FIG. 4), the system can then basically operate by itself automatically, until any upgrading or modification is desired.

Some advantages that can be obtained are:

The lifetime value of a highly ranked customer can be determined.

Providing relevant service levels to users according to rank will be perceived in an affirmative way.

Highly ranked customers can be identified as a customer segment, possibly including sub-segments based on weight factors.

Active measures can be taken to achieve more highly ranked customers from the existing customer base.

Evaluation of customer response to different service offerings and subscriptions can be made "on the fly".

Customers can be made aware of different service values and that they can influence the quality by increased usage.

Highly ranked customers can be rewarded with better quality in a timely and proactive way.

Customers of low ranking can be identified and encouraged to achieve a higher estimation score.

While the invention has been described with reference to specific exemplary embodiments, the description is in general only intended to illustrate the inventive concept and should not be taken as limiting the scope of the invention. Although the concepts of 3GPP, GGSN, PCRF and SPR have been used when describing the above embodiments, any other similar suitable standards, protocols and network elements may basically be used as described herein. The present invention is generally defined by the following independent claims.

The invention claimed is:

1. A method of adapting a multi-media service level for a service consumed by a terminal user in a communication network, comprising the following steps, executed automatically in a service level control system:
   collecting information on service usage of said multi-media service by the user;
   extracting features of a usage pattern of the user from the collected service usage information;
   estimating the user with respect to his/her service usage based on the extracted usage pattern features, by applying a machine learning algorithm on data of the extracted usage pattern features;
   adjusting or introducing a corresponding rule or policy in the user's subscription profile in addition to a Quality-of-Service (QoS) service level already subscribed by the user based on the result from said user estimating step, wherein said rule or policy impacts the resulting service quality;
   adapting the service level of said multi-media service in accordance to the rule or policy in the user's subscription profile; and
   enforcing said rule or policy by a policy enforcing node in the communication network whenever the user invokes the multi-media service, wherein the multi-media service is consumed by said user with the adapted service level.

2. A method according to claim 1, wherein said information on service usage is obtained from a node that logs sessions executed in the network.

3. A method according to claim 2, wherein said information on service usage is obtained by means of charging data records generated by a gateway node in the network.

4. A method according to claim 1, wherein the usage pattern features are extracted by applying said machine learning algorithm and an associated predefined strategy that dictates which features of service usage are relevant and to be considered.

5. A method according to claim 1, wherein the user is estimated by classifying the user according to one or more predefined service usage conditions.

6. A method according to claim 5, wherein a predefined service usage condition is that a certain predetermined threshold level is exceeded with respect to service usage.

7. A method according to claim 6, wherein said predetermined threshold relates to any of: the number of times said multi-media service has been consumed; the amount of communicated data; the connection duration; and the number of times other services have been invoked by the user.

8. A method according to claim 6, wherein a plurality of different threshold levels of one or more service usage conditions are predefined to classify users by an estimation score.

9. A method according to claim 1, wherein the machine learning algorithm is selected from a set of predefined machine learning algorithms.

10. A method according to claim 9, wherein the machine learning algorithm is selected depending on any of: the service type; characteristics of the collected usage information; and what aspect of the service usage is deemed to be valid for the service level.

11. A method according to claim 1, wherein said rule or policy is enforced in the network by a policy control node.

12. A method according to claim 11, wherein said rule or policy is pushed to the policy control node that will update the user's subscription profile in a subscriber profile repository SPR.

13. A method according to claim 1, wherein the service level is adapted for a plurality of services consumed by a terminal user in the network.

14. A method according to claim 1, wherein said usage pattern features of the user are extracted at regular intervals or in response to an operator input command.

15. A service level control system, for adapting a service level for a multi-media service consumed by a terminal user in a communication network, said service level control system implemented on one or more processing circuits, said system comprising:
  a service usage analyzer further comprising a data processor and a data storage, said service usage analyzer configured to collect information on service usage of said multi-media service by the user, and estimate the user with respect to his/her service usage based on features of a usage pattern extracted from the collected service usage information; and
  a subscription policy manager configured to adapt the service level for service usage based on the user estimation by adjusting or introducing a corresponding rule or policy in the user's subscription profile, said rule or policy and a Quality-of-Service service level already subscribed by the user together determining the service quality, and by enforcing said rule or policy in the communication network whenever the user invokes the multi-media service, such that the multi-media service is consumed with the new adapted service level,
  wherein the data storage is further configured to obtain the service usage information from a node that logs sessions executed in the network,
  wherein the feature extractor is further configured to extract the usage pattern features by applying said machine learning algorithm and an associated predefined strategy that dictates which features of service usage are relevant and to be considered.

16. A service level control system for adapting a service level for a multi-media service consumed by a terminal user in a communication network, said service level control system implemented on one or more processing circuits, said system comprising:
  a service usage analyzer further comprising a data processor and a data storage, said service usage analyzer configured to collect information on service usage of said multi-media service by the user, and estimate the user with respect to his/her service usage based on features of a usage pattern extracted from the collected service usage information, said service usage analyzer comprising:
    a feature extractor configured to extract said usage pattern features from the raw data of said user in the data storage based on a predefined strategy by applying a machine learning algorithm and an associated predefined strategy that dictates which features of service usage are relevant and to be considered; and
    a user estimator configured to estimate the user with respect to his/her service usage, based on the extracted usage pattern features and to provide the resulting user estimation to said subscription policy manager; and
  a subscription policy manager configured to adapt the service level for service usage based on the user estimation by adjusting or introducing a corresponding rule or policy in the user's subscription profile, said rule or policy and a Quality-of-Service service level already subscribed by the user together determining the service quality, and by enforcing said rule or policy in the communication network whenever the user invokes the multi-media service, such that the multi-media service is consumed with the new adapted service level.

17. A service level control system according to claim 16, wherein the data storage is further configured to obtain the service usage information from a node that logs sessions executed in the network.

18. A service level control system according to claim 16, wherein the user estimator is further configured to estimate the user by classifying the user according to one or more predefined service usage conditions.

19. A service level control system according to claim 16, wherein the feature extractor is further configured to extract said usage pattern features of the user at regular intervals or in response to an operator input command.

20. A service level control system according to claim 16, wherein the subscription policy manager is further configured to adapt the service level in the network for the user by pushing a corresponding rule or policy to a policy control node that will enforce said rule or policy in the network whenever the user invokes the multi-media service.

* * * * *